(12) United States Patent
Ruehle et al.

(10) Patent No.: US 9,261,188 B2
(45) Date of Patent: Feb. 16, 2016

(54) ACTUATOR ARRANGEMENT FOR A DRIVE TRAIN

(71) Applicant: GETRAG Getriebe- und Zahnradfabrik Hermann Hagenmeyer GmbH & Cie KG, Untergruppenbach (DE)

(72) Inventors: Guenter Ruehle, Loechgau (DE); Stefan Rothvoss, Steinheim (DE); Alexander Kiehlneker, Flein (DE); Christian Anzt, Grossbottwar (DE)

(73) Assignee: GETRAG GETRIEBE-UND ZAHNRADFABRIK HERMAN HAGENMEYER GMBH & CIE KG, Untergruppenbach (DE)

( * ) Notice: Subject to any disclaimer, the term of this patent is extended or adjusted under 35 U.S.C. 154(b) by 142 days.

(21) Appl. No.: 13/956,726

(22) Filed: Aug. 1, 2013

(65) Prior Publication Data

US 2014/0041986 A1 Feb. 13, 2014

(30) Foreign Application Priority Data

Aug. 9, 2012 (DE) .......................... 10 2012 016 235

(51) Int. Cl.
*F16H 63/34* (2006.01)

(52) U.S. Cl.
CPC ............ *F16H 63/3433* (2013.01); *F16H 63/34* (2013.01); *F16H 63/3416* (2013.01); *F16H 63/3475* (2013.01); *F16H 63/3483* (2013.01)

(58) Field of Classification Search
CPC ............ F16H 63/3433; F16H 63/3483; F16D 2048/026

See application file for complete search history.

(56) References Cited

U.S. PATENT DOCUMENTS

| 3,610,004 | A | * | 10/1971 | Neese | 70/218 |
| 2003/0019702 | A1 | * | 1/2003 | Goedecke et al. | 188/353 |
| 2007/0283735 | A1 | * | 12/2007 | Schweiher et al. | 70/245 |
| 2013/0118852 | A1 | | 5/2013 | Schuller et al. | |
| 2013/0306431 | A1 | * | 11/2013 | Ruehle et al. | 192/219.4 |
| 2013/0319806 | A1 | * | 12/2013 | Schindler et al. | 188/353 |

FOREIGN PATENT DOCUMENTS

| DE | 41 27 991 A1 | 2/1993 |
| DE | 198 58 543 A1 | 6/2000 |
| DE | 100 52 261 A1 | 5/2002 |
| DE | 101 36 425 A1 | 2/2003 |
| DE | 102 45 386 A1 | 4/2004 |
| DE | 10 2006 022 963 A1 | 11/2007 |

(Continued)

*Primary Examiner* — Richard Lorence
(74) *Attorney, Agent, or Firm* — Knobbe Martens Olson & Bear LLP

(57) ABSTRACT

Actuator arrangement for a drive train. The actuator arrangement has an actuator pump driven by electric motor, and a clutch actuator, which is designed for actuation of a friction clutch of the drive train and which is connected to a discharge port of the actuator pump. The actuator arrangement has a parking lock actuator, which is designed for actuation of a parking lock arrangement of the drive train. The parking lock actuator has an open position, in which the parking lock arrangement is released, and a closed position, in which the parking lock arrangement is closed. The parking lock actuator is likewise connected to the discharge port of the actuator pump. The parking lock arrangement can be retained in at least one of the open position and the closed position by means of a retaining device.

7 Claims, 3 Drawing Sheets

(56) References Cited

FOREIGN PATENT DOCUMENTS

| | | |
|---|---|---|
| DE | 10 2008 007016 A1 | 8/2008 |
| DE | 10 2009 005 752 A1 | 7/2010 |
| DE | 10 2011 105 068 A1 | 7/2012 |
| DE | 10 2011 100 857 A1 | 11/2012 |
| EP | 1 199 233 A2 | 4/2002 |
| EP | 1 236 918 B1 | 10/2003 |
| EP | 2 664 826 A1 | 11/2013 |
| WO | WO 2004/031623 A1 | 4/2004 |
| WO | WO 2008/101459 A1 | 8/2008 |
| WO | WO 2012/025192 A1 | 3/2012 |

\* cited by examiner

ACTUATOR ARRANGEMENT FOR A DRIVE TRAIN

CROSSREFERENCES TO RELATED APPLICATIONS

This application claims the priority of German patent application DE 10 2012 016 235.9, filed Aug. 9, 2012.

BACKGROUND OF THE INVENTION

The present invention relates to an actuator arrangement for a drive train, having an actuator pump driven by electric motor, having a clutch actuator, which is designed for actuation of a friction clutch of the drive train and which is connected to a discharge port of the actuator pump, and having a parking lock actuator, which is designed for actuation of a parking lock arrangement of the drive train, wherein the parking lock actuator has an open position, in which the parking lock arrangement is released, and a closed position, in which the parking lock arrangement is closed.

The present invention furthermore relates to a drive train for a motor vehicle having at least one friction clutch and a parking lock arrangement and having an actuator arrangement of the abovementioned type.

Automated drive trains for motor vehicles typically have a parking lock arrangement, which, for example, can have a ratchet wheel which is connected to a transmission output shaft and in the toothing of which a pawl connected to the housing can engage in order to establish a closed position (parking lock position).

In conventional converter-type automatic transmissions, parking lock arrangements of this kind can be actuated manually, e.g. by way of the selector lever and a control cable connected therewith.

Moreover, actuating the parking lock arrangement by means of a hydraulic parking lock actuator is also known in automatic transmissions. This applies especially to automatic transmissions in which friction clutches or other elements are actuated hydraulically. Actuation of a parking lock arrangement by a parking lock actuator is also referred to as "park by wire".

Actuator arrangements for drive trains in which a clutch actuator actuates a friction clutch often have a pump driven by an internal combustion engine, said pump supplying a line pressure via a pressure control valve when the internal combustion engine is operating. Pressures for operating clutch actuators and the like are then taken off from the line pressure via electromechanical valve arrangements. Owing to the fact that the pump runs continuously during the operation of the motor vehicle, the efficiency of actuator arrangements of this kind is relatively low.

More generally, however, driving pumps of this kind by electric motor is also known. Actuator arrangements for friction clutches in which a pump is driven by electric motor and in which a discharge port of the pump is connected directly, i.e. without any intermediate valves, to a clutch actuator are furthermore known.

SUMMARY OF THE INVENTION

Given this background, it is an object of the invention to indicate an improved actuator arrangement for a drive train, and a drive train fitted with an actuator arrangement of this kind, wherein high efficiency is achieved and/or the number of components and hence the outlay on construction are reduced.

This object is achieved, in the case of the actuator arrangement mentioned at the outset, by virtue of the fact that the parking lock actuator is likewise connected to the discharge port of the actuator pump, wherein the parking lock arrangement can be retained in the open position and/or in the closed position by means of a retaining device.

In the actuator arrangement according to the invention, a "park by wire" actuation of a parking lock arrangement can be achieved, wherein the actuator arrangement can be implemented with a small number of components. In particular, it is possible to implement the actuator arrangement without solenoid valves specially provided for the parking lock arrangement. In particular, no proportional valves are necessary in the actuator arrangement.

Accordingly, the installation space for and the costs of the actuator arrangement can be kept down.

By means of the retaining device, it is possible to ensure in a suitable manner that unintended actuation of the parking lock arrangement can be avoided, despite the parallel connection of the clutch actuator and of the parking lock actuator to the discharge port of the actuator pump.

The drive train can have a drive motor in the form of an internal combustion engine. In this case, suitable control must be employed to ensure that, when there is a need to change the position of the parking lock arrangement, the motor vehicle does not accidentally start. On the one hand, this can be achieved in this case by disengaging gear stages in a stepped transmission arranged after the friction clutch in the power transmission path. As an alternative or in addition to this, measures can be taken to ensure that the friction clutch is actuated in a different pressure range from the parking lock arrangement.

A particularly preferred option is one in which the drive train has an electric machine as a drive motor. In drive trains of this kind, of the type used in electric vehicles, or indeed in hybrid vehicles, the motor vehicle can be started by means of the electric machine. In this case, the friction clutch can be actuated, i.e. closed, while the vehicle is stationary, irrespective of the state of gear stages in a downstream stepped transmission, in order in this way to actuate the parking lock actuator, e.g. to move it from a closed position to an open position.

It is furthermore preferred overall if the retaining device is designed to retain the parking lock arrangement both in the open position and in the closed position. In this embodiment, the parking lock arrangement is implemented as a "normally stay" parking lock arrangement, and therefore the parking lock must be both engaged and disengaged by means of auxiliary power.

This ensures that actuation of the parking lock arrangement is possible only if the retaining device releases the parking lock arrangement.

In all other operating states, i.e. if the retaining device retains the parking lock arrangement in the open position or in the closed position, the clutch actuator can be operated in any desired manner by means of the actuator pump without this having an effect on the parking lock arrangement, and/or without the parking lock actuator system affecting the actuation of the friction clutch.

The object is thus fully achieved.

According to a particularly preferred embodiment, the parking lock actuator has a parking lock piston, which is mechanically connected to the parking lock arrangement and, likewise as a preferred option, is preloaded in the direction of the closed position.

The preloading can be accomplished mechanically by means of a spring or, alternatively, hydraulically.

A parking lock piston/cylinder arrangement, which has a parking lock cylinder and the parking lock piston, is preferably designed as a single-acting piston/cylinder arrangement, that is to say preferably has just one hydraulic port, which is connected to the discharge port of the actuator pump.

In this embodiment, the parking lock arrangement can be opened against the preloading of the parking lock piston through suitable operation of the actuator pump.

The discharge port of the actuator pump is preferably connected via an orifice plate to an unpressurized section, such as a tank. When the actuator pump is not being operated, the preloading can accordingly push the parking lock piston into the closed position.

According to another preferred embodiment, the parking lock piston is part of a parking lock piston/cylinder arrangement, wherein, for the purpose of preloading the parking lock piston into the closed position, the preloading device engages on a section of the parking lock piston which is arranged outside a parking lock cylinder of the parking lock piston/cylinder arrangement.

By arranging the preloading device outside the parking lock cylinder, the parking lock piston can adopt a defined position in relation to the parking lock cylinder, especially in the open position, and, in particular, can strike against an end wall of the parking lock cylinder.

It is thereby possible to ensure that a volume of the parking lock cylinder remains constant in the open position. Consequently, the friction clutch can be operated in a trouble-free manner. If a mechanical preloading spring is arranged in the parking lock cylinder, it may be more difficult to keep the volume of the parking lock cylinder constant in the open position. In this case too, however, it is conceivable to establish a defined stop position between the parking lock piston and the parking lock cylinder in the open position of the parking lock arrangement in order to keep the volume of the parking lock cylinder constant.

In general, it is conceivable for suitable valves to be arranged between the actuator pump and the clutch actuator or the parking lock actuator, said valves preferably being directional control valves which are not proportionally acting. This makes it possible to install the actuator arrangement where the requirements for cleanliness are relatively low.

However, in one aspect of the invention the clutch actuator and/or the parking lock actuator is/are connected directly to the discharge port of the actuator pump.

In this embodiment, the actuator arrangement can be implemented essentially without valves.

At the same time, it is understood that the discharge port is preferably connected to a pressure sensor in order to be able to measure the pressure and regulate it by adjusting the rotational speed of the actuator pump.

According to another preferred embodiment, the retaining device engages on a retaining projection connected to a parking lock piston or to a parking lock member of the parking lock arrangement.

The parking lock member can be a parking lock pawl, for example.

However, it is preferred if the retaining projection is connected to a parking lock piston. This enables the retaining device to act directly on the parking lock piston and consequently allows the position of the parking lock piston in the open and/or in the closed position to be defined. It is thereby likewise possible to prevent the occurrence of volume changes in the parking lock cylinder during actuation of the friction clutch, especially in the open position.

According to another embodiment, which is preferred overall, the retaining device has a retaining position and a release position, wherein the retaining device is preloaded into the retaining position.

In this variant, the parking lock arrangement can be implemented as a "normally stay" arrangement in the open and/or in the closed position, but especially in both positions. In other words, it is necessary in each case, in order to change from the open position and the closed position, to move the retaining device into the release position by means of auxiliary power, more specifically against the preloading of the retaining device.

The retaining device can be actuated in various ways.

According to a preferred variant, the retaining device is actuated by means of a solenoid actuator.

This results in a variant of very simple construction.

In another aspect of the invention, the drive train has a further friction clutch, which can be actuated by means of a further clutch actuator, which is connected to the discharge port of a further actuator pump, wherein the retaining device can be actuated by means of the further actuator pump.

In one variant, the retaining device can be connected to a suction port of the further actuator pump. In this case, the retaining device can then be moved into the release position when the further friction clutch is opened. As a requirement for this, the further actuator pump must be capable of being driven bidirectionally, in particular by means of an electric motor.

In an alternative variant, the retaining device is connected to the discharge port of the further actuator pump. In this case, transfer of the retaining device to the release position can generally take place when the further friction clutch is closed.

In the case of drive trains incorporating an internal combustion engine, care must be taken here to ensure that no gear stage is engaged in the stepped transmission (e.g. the associated transmission section). In the case of drive trains incorporating an electric machine as the drive motor, the closure of the clutch can have the advantage that actuation of the parking lock arrangement is possible only when the further friction clutch is closed.

In another embodiment, it is advantageous if a retaining piston/cylinder arrangement is connected to the discharge port of the further actuator pump, wherein the retaining piston/cylinder arrangement is preloaded into a retaining position, wherein the preloading is chosen in such a way that a release pressure greater than a maximum working pressure for actuating the further friction clutch has to be applied to the retaining piston/cylinder arrangement to move the retaining piston/cylinder arrangement into a release position.

In this embodiment, the further friction clutch can be actuated by regulating the pressure at the discharge port of the further actuator pump over the entire adjustment range without the retaining device being moved from the retaining position into the release position. It is only when the further friction clutch is "over-pressed" that the retaining device is transferred from the retaining position to the release position.

According to another preferred embodiment, which represents an independent invention according to another (second) aspect, the parking lock actuator can be retained in an open position and/or in a closed position by means of a retaining device, wherein the retaining device can be actuated by means of a cooling pressure source, which is designed for cooling at least one component of the drive train.

In cases such as this, in which the friction clutch and/or the further friction clutch is/are designed as a wet friction clutch or wet friction clutches, it is the general practice for a clutch arrangement of this kind always to contain a cooling arrangement as well. The cooling arrangement supplies cooling oil, which is preferably fed in in the manner of injection lubrication radially with respect to a hub of the friction clutch(es), from where it is flung radially outwards into the friction clutches in order to be able efficiently to dissipate the heat which arises there, especially during slipping operation.

However, clutch arrangements of this kind are also used alternatively or in addition for cooling drive motors, e.g. for cooling an electric driving machine.

The basic concept of the invention according to this further aspect thus resides in the fact that a cooling pressure source provided for this purpose is additionally used to actuate the retaining device.

The outlay on components can thereby be further reduced.

According to an embodiment preferred in this context, the cooling pressure source has a cooling pump, which is driven bidirectionally by electric motor, the discharge port of which is connected to the component to be cooled and the suction port of which is connected to a retaining piston/cylinder arrangement of the retaining device.

To shift the retaining device from a retaining position to a release position, the direction of rotation of the cooling pump is set in such a way that fluid can be delivered into the retaining piston/cylinder arrangement. Since, in general, the changing of the position of the parking lock arrangement preferably takes place when the vehicle is stationary, active cooling of the friction clutch(es) in this phase is not necessary, and therefore the cooling pump can be used without functional restrictions to actuate the retaining device.

The retaining piston/cylinder arrangement is preferably a single-acting arrangement and is preferably preloaded into a retaining position by means of an energy storage device. In order to ensure reliable emptying of the retaining piston/cylinder arrangement, it may be advantageous briefly to reverse the direction of rotation of the cooling pump in order to deliver cooling oil towards the component to be cooled. As an alternative, internal leakage of the cooling pump can be used, and the electric motor for driving the cooling pump can be reversed in stages, with the result that the supply of cooling fluid to the component to be cooled essentially does not take place. It is thereby possible to improve the efficiency of the arrangement overall.

In the case of the initially mentioned, first aspect of the present invention, the parking lock actuator is connected to the discharge port of the actuator pump.

In the case of the second aspect of the present invention, in which the cooling pressure source is designed for actuating the retaining device, it is possible in one variant to connect the parking lock actuator to the suction port of the actuator pump.

In this case, the direction of rotation of the actuator pump, which is driven bidirectionally in this case, is reversed in order to actuate the parking lock actuator.

In all the cases described above in which the retaining device is not actuated by means of the cooling pressure source, the cooling pressure source can likewise have a cooling pump driven by electric motor, although, in this case, said cooling pump can be of monodirectional design. As a result, a relatively small, lightweight cooling pump may be sufficient for the cooling pressure source overall. In some variants, a further cooling pump designed for cooling a drive motor is provided in addition to a cooling pump designed for cooling the friction clutch(es).

In this case, the actuation of the retaining device can also be accomplished by means of the further cooling pump, which in this case is preferably designed as a pump driven bidirectionally by electric motor.

In this case, it is possible to actuate the retaining device independently of the cooling of the friction clutch(es) and/or independently of the actuation of the friction clutch (es).

It goes without saying that the features mentioned above and those which remain to be explained below can be used not only in the respectively indicated combination but also in other combinations or in isolation without exceeding the scope of the present invention.

BRIEF DESCRIPTION OF THE DRAWINGS

Illustrative embodiments of the invention are shown in the drawing and are explained in greater detail in the following description. In the drawing.

DESCRIPTION OF PREFERRED
EMBODIMENTS

Figure 1:
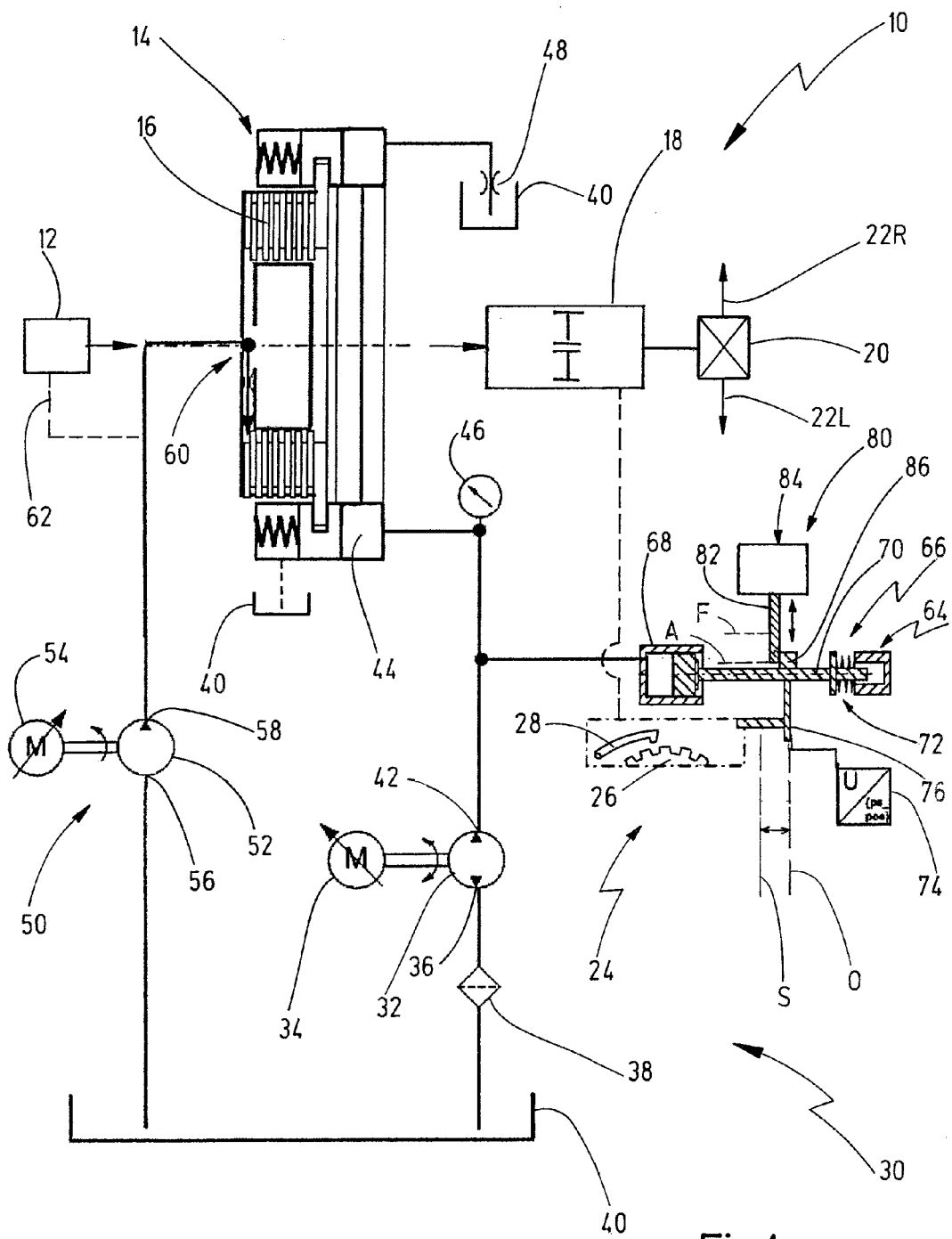
FIG. 1 shows a schematic illustration of a drive train of a motor vehicle having a first embodiment of an actuator arrangement according to the invention.

In FIG. 1, a first embodiment of a drive train for a motor vehicle is illustrated and denoted in general by 10. The drive train 10 has a drive motor 12, which can be designed as an internal combustion engine or as an electric motor or as a hybrid drive motor. The drive train 10 furthermore has a friction clutch arrangement 14 which, in the present case, includes a friction clutch 16. An input member of the friction clutch 16 is connected to the drive motor 12. An output of the friction clutch 16 is connected to a transmission 18, which can be embodied as a stepped transmission of layshaft construction, for example. An output of the transmission 18 is connected to a differential 20, by means of which motive power can be distributed between driven wheels 22L, 22R.

The friction clutch 16 is embodied as a wet multi-plate clutch. It can be arranged as a starting and separating clutch between the drive motor 12 and the transmission 18. In the case of a dual clutch transmission, the friction clutch arrangement 14 can also have two such friction clutches, which are connected to two input shafts of a dual clutch transmission in a manner known per se.

The friction clutch 16 can furthermore be part of a purely electric drive train, wherein, for example, two friction clutches are provided, by means of which a transmission limited to two gear stages can be formed. In this case, the two friction clutches are designed as power shift clutches.

The drive train 10 furthermore has a parking lock arrangement 24, which can be integrated into the transmission 18, for example, as indicated by a dashed line. The parking lock arrangement 24 can take various forms. Often, parking lock arrangements 24 of this kind include a parking lock ratchet wheel 26, which is connected, for example, to a transmission output shaft, and a parking lock pawl 28, which is fixed pivotably on a housing of the transmission 18. In an open position of the parking lock arrangement 24, the parking lock pawl 28 releases the parking lock ratchet wheel 26. In a closed position (parking lock position) of the parking lock arrangement 24, the parking lock pawl 28 engages in the parking lock ratchet wheel 26, thus making it possible to prevent the vehicle fitted with a drive train 10 of this kind from rolling away accidentally.

The drive train 10 furthermore has an actuator arrangement 30. The actuator arrangement 30 has a hydraulic section and, if appropriate, can also include electromechanical components, such as electromagnets, electric actuating drives etc.

For actuation of the friction clutch 16, the actuator arrangement 30 includes an actuator pump 32, which can be driven bidirectionally by means of an electric motor 34. The actuator pump 32 has a suction port 36, which is connected to a tank 40 for hydraulic fluid, optionally via a filter 38. The hydraulic fluid can be an automatic transmission fluid, for example.

The actuator pump 32 furthermore includes a discharge port 42, which is connected directly to a clutch actuator 44. The clutch actuator 44 can have a single-acting piston/cylinder arrangement, for example, said arrangement being designed to press a plate pack of the friction clutch 16 into contact in order in this way to bring the friction clutch into a slipping state or to close it.

The friction clutch 16 can include a return spring (not shown specifically), by means of which the friction clutch 16 is preloaded into an open position ("normally open" clutch).

A pressure sensor 46 is connected to a fluid line which connects the discharge port 42 and the clutch actuator 44. The clutch actuator 44 (and/or the line connecting the discharge port 42 and the clutch actuator 44) is furthermore connected to the tank 40 via an orifice plate 48. In this case, the friction clutch 16 can be closed in a controlled manner, such that it is activated so as to transmit a certain torque and/or a certain power. For this purpose, the electric motor 34 is activated in order to drive the actuator pump 32. By means of the volume flow supplied by this means at the discharge port 42, a pressure is established in the clutch actuator 44, and this pressure can be measured by means of the pressure sensor 46. The measured pressure can be fed back via a control device (not designated specifically) in order in this way to regulate the pressure by adjusting the speed of the electric motor 34.

The orifice plate 48 ensures that a small volume flow flows off towards the tank 40, thereby improving the ability of regulating the pressure.

The actuator arrangement 30 furthermore has a cooling pressure source 50, by means of which cooling fluid is fed to the friction clutch 16. In the present case, the cooling fluid is the same fluid as that used for the actuator system. The cooling pressure source 50 has a cooling pump 52, which can be driven by means of a further electric motor 54. In the present case, the cooling pump 52 is embodied as a pump of relatively small dimensions capable of monodirectional operation. A suction port 56 is connected to the tank 40, if appropriate via a fluid filter. A discharge port 58 of the cooling pump 52 is connected to a clutch cooling system 60, which, for example, has a hub which is arranged radially to the inside of the friction clutch 16 and via which the cooling fluid is fed in. The cooling fluid is flung radially outwards by the hub during operation, owing to centrifugal forces, and fed to the plate pack. In the slip mode, in particular, heat arising in the plate pack during this process can be dissipated efficiently by means of the cooling fluid. The cooling fluid then drips back into the tank 40, e.g. via housing walls of the friction clutch 16, as indicated schematically in FIG. 1.

The drive motor 12 can likewise have a motor cooling system, as indicated schematically at 62 in FIG. 1. The drive motor 12 can be an electric machine, for example. In this case, cooling can be accomplished by means of the same fluid as the cooling of the friction clutch 16. In this case, the motor cooling system 62 can also be connected to the discharge port 58 of the cooling pump 52, as indicated schematically in FIG. 1.

As an alternative, a further cooling pump can be provided for the motor cooling system 62, said pump being driveable by means of a further electric motor and the suction port thereof being connected to the tank 40 and the discharge port thereof being connected to the motor cooling system 62.

The actuator arrangement 30 furthermore has a parking lock actuator 64. The parking lock actuator 64 includes a parking lock piston/cylinder arrangement 66, which is designed as a single-acting piston/cylinder arrangement. Here, the parking lock piston/cylinder arrangement 66 includes a parking lock cylinder 68 and a parking lock piston 70. The parking lock piston 70 is preloaded into a closed position S by means of a preloading device 72 provided outside the parking lock cylinder 68. By filling the parking lock cylinder 68, the parking lock piston 70 can be moved from the closed position S into an open position O, against the action of the preloading device 72. To check the current position of the parking lock piston 70, a position sensor 74 can be provided.

The parking lock piston 70 is coupled to the parking lock arrangement 24 by way of a schematically indicated mechanical coupling 76. For example, the parking lock piston can be designed in the manner of a sliding key, which is arranged between the parking lock pawl 28 and a housing wall of the transmission 18.

A parking lock arrangement of this kind is basically described in document U.S. Pat. No. 7,861,839 B2, the disclosure of which is incorporated in full by reference in the present case.

In the present case, the parking lock piston/cylinder arrangement 66 is connected directly to the discharge port 42 of the actuator pump 32, that is to say, in particular, without the interposition of proportional valves and, preferably, without interposition of directional control valves or the like. If a sufficient pressure is built up at the discharge port 42, the parking lock piston 70 can therefore be moved from the closed position S into the open position O against the force of the preloading device 72. This state is illustrated in FIG. 1. In other words, FIG. 1 shows the parking lock arrangement 24 in the open position O.

Since the discharge port 42 is also used to actuate the friction clutch 16, i.e. to initiate its closure or opening, or even actively to open it (by reversal of the direction of rotation of the actuator pump 32), the actuator arrangement 30 furthermore includes a retaining device 80. The retaining device 80 is designed mechanically to retain the parking lock arrangement 24 in the open position O and preferably also in the closed position S.

In this case, the retaining device 80 can engage on one member of the parking lock arrangement 24, e.g. on the parking lock pawl 28. However, it is particularly preferred if, as illustrated in FIG. 1, the retaining device 80 has a retaining member 82 which engages on the parking lock piston 70.

The retaining member 82 can be moved between a retaining position A (as illustrated in FIG. 1) and a release position F by means of a retaining actuator 84. In this case, the retaining actuator 84 can be an electromechanical component, e.g. an electromagnet. It is preferred if the retaining device 80 is preloaded mechanically into the retaining position A, e.g. by means of a spring (not shown specifically in FIG. 1).

In the present case, a retaining projection 86 is formed on the parking lock piston 70. In the open position O shown in FIG. 1, the retaining member 82 engages behind the retaining projection 86 in such a way that the parking lock piston 70 cannot be moved into the closed position. In this case, the parking lock piston 70 is preferably in a stop position in relation to the parking lock cylinder 68, such that the volume of the parking lock cylinder 68 remains constant. As a result, the actuation of the friction clutch 16 can take place essentially without being affected by the parking lock piston/cylinder arrangement 66.

If the retaining actuator 84 is supplied with auxiliary power in order to shift the retaining member 82 from the retaining position A to the release position F, the parking lock piston 70 can move freely, independently of the retaining device 80. For closure of the parking lock arrangement, the preloading device 72 pushes the parking lock piston 70 in the direction of the closed position S. In this case, there is a pressure reduction in the parking lock cylinder 68 by way of the orifice plate 48. This process can be assisted, if appropriate, by reversing the direction of rotation of the actuator pump 32. As an alternative, internal leakage of the actuator pump 32 can be used, wherein the electric motor 34 is reversed somewhat, if appropriate.

As soon as the parking lock piston/cylinder arrangement 66 has reached the closed position S, the supply of auxiliary power to the retaining actuator 84 is interrupted. In this case, the mechanical preloading described above shifts the retaining member 82 back into the retaining position A, wherein the retaining member 82 preferably engages behind the retaining projection 86 from the opposite side during this process, when viewed in the direction of the axial extent of the parking lock piston 70.

By means of this measure, the parking lock arrangement 24 is moved into the closed position, that is to say, for example, the parking lock pawl 28 is introduced into the parking lock ratchet wheel 26. Between the mechanical coupling 76 and the parking lock pawl 28, a spring arrangement can furthermore be provided in this case, said arrangement ensuring that reliable engagement of the parking lock pawl 28 is possible, even when the parking lock pawl 28 is arranged in the current relative position above a tooth of an external toothing of the parking lock ratchet wheel 26, as also described, for example, in document U.S. Pat. No. 7,861,839 B2 described above.

By means of the retention of the parking lock arrangement 24 in the closed position, the relative position between the parking lock cylinder 68 and the parking lock piston 70 is once again fixed, thereby keeping the volume of the parking lock cylinder 68 constant. In this case, the friction clutch 16 can be actuated without being influenced by the parking lock arrangement 24.

Owing to the retaining device acting both in the open and in the closed position, the parking lock arrangement 24 is embodied as a "normally stay" parking lock arrangement. In other words, it is necessary to supply auxiliary power to change the position of the parking lock arrangement.

In order to establish an emergency mode, e.g. if an electric energy supply fails, the parking lock arrangement 24 can be coupled to an emergency unlocking system, although this is not shown in FIG. 1 for reasons of clarity.

To shift the parking lock arrangement 24 into the open position O, the independent activation of two components is furthermore required, namely, on the one hand, the activation of the electric motor 34 and, on the other hand, the activation of the retaining actuator 84. This gives rise to a redundancy and consequently to increased safety when releasing the parking lock device from the closed position S.

Activation of the retaining actuator 84 is also required in all cases in order to shift the parking lock arrangement from the open position to the closed position. If appropriate, the emptying of the parking lock cylinder 68 should be supported by suitable activation of the electric motor 34. In this case too, unintentional actuation of the parking lock arrangement is significantly reduced. To obtain this functionality, all that is required is to provide a parking lock piston/cylinder arrangement 66 and a retaining device 80. The other components, such as the actuator pump 32 with the electric motor 34, are present in the actuator arrangement 30 in any case and therefore actuation of the parking lock arrangement 24 can be achieved with a small number of additional components, this being advantageous as regards costs, as regards installation space and as regards assembly effort.

Since the actuation of the parking lock arrangement 24 from the open to the closed position and vice versa is accomplished by way of the discharge port 42, by means of which the friction clutch 16 is also activated, suitable sequence control is preferably used to ensure that actuation of the parking lock arrangement takes place in coordination with the actuation of other components.

Since the changing of the position of the parking lock arrangement 24 generally takes place while the motor vehicle is stationary or travelling at very low speeds, such sequence control is relatively simple to set up. Where an internal combustion engine is used as the drive motor 12, provision may be made here, if appropriate, to disengage gear stages of the transmission 18 before the parking lock arrangement is actuated.

Where an electric motor is used as the drive motor 12, start-up is generally performed in any case by means of the electric motor, and therefore the clutch 16 can be closed in the stationary condition. Particularly when a drive train includes a two-speed power shift transmission having two friction clutches engaging and disengaging two different gear stages, closing one of the clutches connects the output of the motor vehicle to the electric motor, thus making it possible, for example, for auxiliary torque to be supplied by the electric motor when the parking lock is being engaged or disengaged on a slope, for example.

In the following figures, FIGS. 2 to 4, further embodiments of actuator arrangements are shown, these corresponding in general, in terms of construction and operation, to the actuator arrangement 30 in FIG. 1. Identical elements are therefore indicated by the same reference signs. It is essentially the differences which are explained below.

In the following figures, FIGS. 2 to 3, the drive train in each case has a further friction clutch 16A. The further friction clutch 16A is actuated by means of a further clutch actuator 44A. The further clutch actuator 44A is in each case connected to the discharge port 42A of a further actuator pump 32A, which is driven bidirectionally by means of a further electric motor 34A. The suction port of the further actuator pump 32A is connected to the tank 40. The further friction clutch 16A is furthermore cooled by means of a further clutch cooling system 60A, which can be connected jointly to a rotary union 88 together with the clutch cooling system 60 of the first friction clutch 16.

Figures 2, 3:
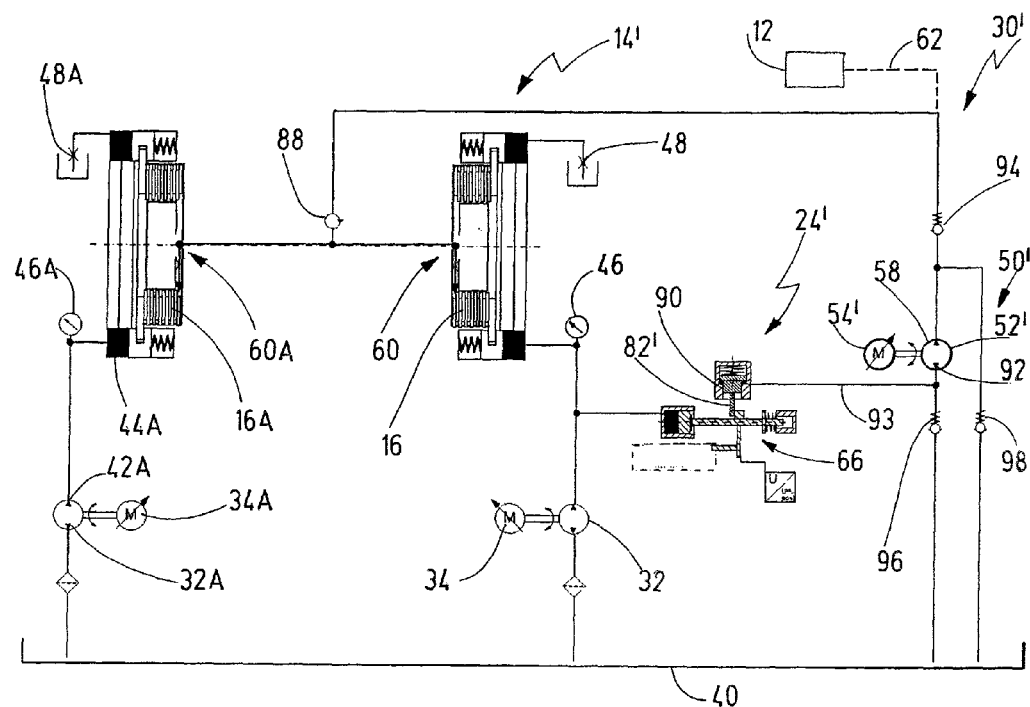
FIG. 2 shows a schematic illustration of a further embodiment of an actuator arrangement according to the invention.
FIG. 3 shows a schematic view of a further embodiment of actuator arrangement according to the invention.

FIG. 2 shows an actuator arrangement 30', in which the clutch cooling system 60 of the friction clutch 16 and the clutch cooling system 60A of the further friction clutch 16A are supplied by a cooling pressure source 50', which, in the present case, has a cooling pump 52' that can be driven bidirectionally by means of an electric motor 54'. A discharge port 58 of the cooling pump 52' is connected to the rotary union 88 and the clutch cooling systems 60, 60A. A suction port 92 (corresponding to suction port 56) is furthermore connected to a retaining piston/cylinder arrangement 90 by way of connecting line 93. The retaining piston/cylinder arrangement 90 is a single-acting piston/cylinder arrangement having a mechanical preloading spring which preloads the retaining member 82' into the retaining position A. In the present case, the discharge port 58 of the cooling pump 52' is connected to the rotary union 88 and to the clutch cooling systems 60, 60A by way of a first nonreturn valve 94. The suction port 92 is furthermore connected to the tank 40 by way of a second nonreturn valve 96. Finally, the discharge port 58 is connected to the tank 40 by way of a third nonreturn valve 98.

If the cooling pressure source 50' is used for cooling the friction clutches 16, 16A, the cooling pump 52' is driven in a direction in which the fluid is sucked out of the tank 40 via the second nonreturn valve 96 and delivered through the first nonreturn valve 94 towards the friction clutches 16, 16A. In this case, the third nonreturn valve 98 is closed.

If the cooling pressure source 50' is used to activate the retaining piston/cylinder arrangement 90, the direction of rotation is reversed. In this case, fluid is sucked out of the tank 40 via the third nonreturn valve 98. In this case, the first nonreturn valve 94 is preferably closed. The second nonreturn valve 96 is furthermore closed, such that the induced fluid is conveyed into the retaining piston/cylinder arrangement 90 via the line 93, moving a piston of the retaining piston/cylinder arrangement 90, said piston being connected to the retaining member 82', out of the retaining position A into the release position F, against the force of the mechanical preloading spring. To move the retaining member 82' back into the retaining position A, it is possible in the simplest case for the cooling pump 52' to be stopped. In order to assist the emptying of the retaining piston/cylinder arrangement 90, it is also possible, however, for the cooling pump 52' to be turned back in the cooling direction, with internal leakage of the cooling pump 52' being used. As an alternative, the cooling pump 52' can also be driven in the other direction again, in which fluid is conveyed to the friction clutches 16, 16A.

In the case of FIG. 2, the cooling pressure source 50', which is present in any case, is consequently used to actuate the retaining device 80. In this case, a further, separate actuator, such as a solenoid actuator, is not required. Accordingly, the actuator arrangement 30' can be implemented with a small number of components.

FIG. 3 shows a further actuator arrangement 30'', which corresponds in general to the actuator arrangement 30' in FIG. 2 as regards construction and operation. Identical elements are therefore indicated by the same reference signs. It is essentially the differences which are explained below.

In the actuator arrangement 30'', the retaining piston/cylinder arrangement 90 is not actuated by means of the cooling pressure source but by means of the further actuator pump 32A. In this case, the cooling pressure source 50 can be constructed like the cooling pressure source 50 in FIG. 1, and in particular with a monodirectionally acting cooling pump 52.

In the actuator arrangement 30'', the retaining piston/cylinder arrangement 90 is connected to the suction port 36A of the further actuator pump 32A' by a connecting line 102. On the one hand, the discharge port 42A of the further actuator pump 32A is connected to the tank 40 via orifice plate 48A and, on the other hand, is connected to the tank by way of a fourth nonreturn valve 100.

In this embodiment, the fourth nonreturn valve 100 is closed when the further actuator pump 32A is driven in a direction in which the fluid is delivered from the tank in the direction of the further clutch actuator 44A. To improve control, an orifice plate 48A is provided in this case in the line connecting the discharge port 42A' to the tank 40.

In the opposite direction of rotation of the further actuator pump 32A, fluid is delivered from the tank 40 by way of the fourth nonreturn valve 100 and supplied to the suction port 36A. If appropriate, a further nonreturn valve can be arranged there. In general, however, it is also possible, without such a nonreturn valve at the suction port 36A, to supply a sufficient volume flow to shift the retaining piston/cylinder arrangement 90 out of the retaining position A into the release position F by way of line 102.

In this variant, the parking lock arrangement 24 can be actuated when the further friction clutch 16A is open or is being opened.

In FIG. 3, it is furthermore indicated, at 104, that, as an alternative, the retaining piston/cylinder arrangement 90 can also be connected to the discharge port 42A of the further actuator pump 32A. In this case, the fourth nonreturn valve 100 is not necessary.

In this case, the mechanical preloading spring of the retaining piston/cylinder arrangement 90 is preferably designed in such a way that the retaining member 82', which is connected to the piston of the retaining piston/cylinder arrangement 90, is not moved if the pressure at the discharge port 42A is within a normal operating pressure range of the friction clutch 16A. It is only when a release pressure applied at the discharge port 42A is greater than the maximum operating pressure for actuating the further friction clutch 16A that the retaining member 82' is moved into the release position. In this state, the further clutch 16A is "over-pressed".

Figure 4:
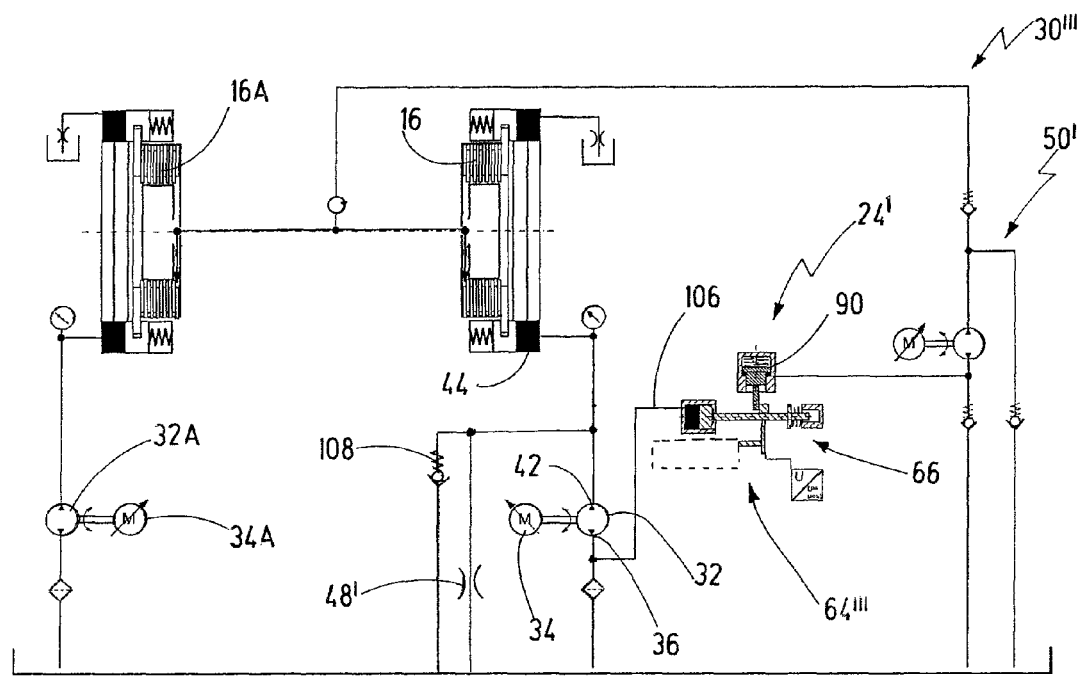
FIG. 4 shows a schematic view of a further embodiment of an actuator arrangement according to the invention.

FIG. 4 shows a further embodiment of an actuator arrangement 30''', which corresponds in general to the actuator arrangement 30' in FIG. 2. In particular, the retaining piston/cylinder arrangement 90 is connected to the cooling pressure source 50', which is of exactly the same design as in FIG. 2.

In actuator arrangement 30''', however, the parking lock piston/cylinder arrangement 66 is not connected to the discharge port 42 of the actuator pump 32 but to the suction port 36 thereof.

In this case, the discharge port 42 of the actuator pump 32 is connected to the tank by way of a fifth nonreturn valve 108. An orifice plate 48' can furthermore likewise be arranged in a parallel line between the discharge port 42 and the tank.

In one direction of rotation of the actuator pump 32, fluid is passed out of the tank 40 to the discharge port 42. In this case, the fifth nonreturn valve 108 is closed. Here, the actuator pump 32 can be used to fill the clutch actuator 44.

When the direction of rotation is reversed, fluid is sucked out of the tank 40 by way of the fifth nonreturn valve 108 and made available at the suction port 36, which is connected to the parking lock piston/cylinder arrangement 66 in order to move the latter from the closed position S to the open position O.

Figure 5:
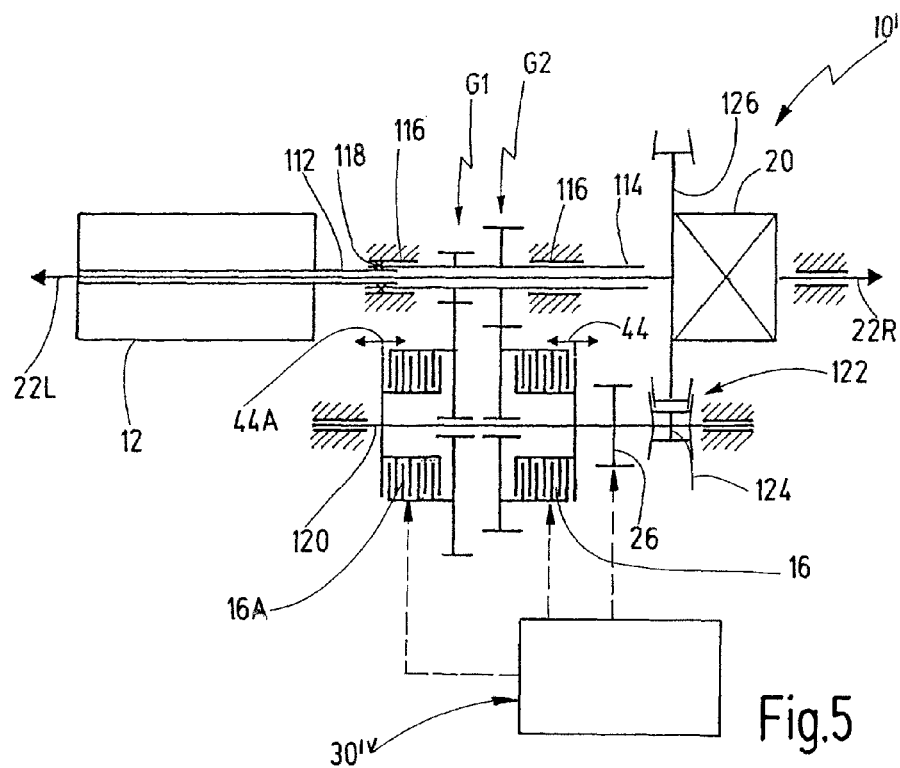
FIG. 5 shows a schematic illustration of a further embodiment of a drive train according to the invention having an actuator arrangement according to the invention.

FIG. 5 shows another embodiment of a drive train 10', which has an electric machine as the drive motor 12. A motor shaft 112 is designed as a hollow shaft and is coupled for conjoint rotation to an intermediate hollow shaft 114. The intermediate hollow shaft 114 is rotatably mounted on a housing by means of two bearings 116. The connection between the motor shaft 112 and the intermediate hollow shaft 114 is shown at 118.

The drive train 10' furthermore has a layshaft 120. The intermediate hollow shaft 114 and the layshaft 120 are connected to one another by two gearsets for setting up two gear stages G1, G2. The corresponding fixed gears are fixed on the intermediate hollow shaft 114. The respective free pinions are mounted rotatably on the layshaft 120. A first friction clutch 16 and a further friction clutch 16A are furthermore mounted on the layshaft 120, wherein the free pinion of the second gear stage G2 can be connected to the layshaft by means of the first friction clutch 16, and wherein the free pinion of the first gear stage G1 can be connected to the layshaft 120 by means of the further friction clutch 16A.

The layshaft 120 is connected to the differential 20 by an output gearset 122. The output gearset 122 has a first gearwheel 124, which is connected to the layshaft 120, and a second gearwheel 126, which is connected to an input member of the differential 20.

In the present case, the differential is arranged coaxially with the motor shaft 112, such that the one output shaft for the driven wheel 22L is passed through the intermediate hollow shaft 114, through the motor shaft 112 and through the electric machine 12. However, the differential 20 can also be arranged with a parallel offset with respect to the motor shaft 112.

A parking lock ratchet wheel 26 is furthermore fixed on the layshaft 120. Each of the actuator arrangements 30', 30", 30'" in FIGS. 2 to 4 can be used as an actuator arrangement 30$^{IV}$ for the drive train 10' in FIG. 5, as indicated schematically By arrows.

What is claimed is:

1. Actuator arrangement for a drive train, having a friction clutch and a parking lock arrangement, the actuator arrangement comprising:
    an actuator pump comprising a discharge port and driven by an electric motor,
    a clutch actuator, which is designed for actuation of the friction clutch of the drive train and which is connected to the discharge port of the actuator pump,
    a parking lock actuator, which is designed for actuation of the parking lock arrangement of the drive train, wherein the parking lock actuator has an open position, in which the parking lock arrangement is released, and a closed position, in which the parking lock arrangement is closed, and
    a retaining device by means of which the parking lock arrangement can be retained in at least one of the open position and the closed position,
    the parking lock actuator being connected to the discharge port of the actuator pump, and
    the clutch actuator and the parking lock actuator being connected directly to the discharge port of the actuator pump, so that the pressures exerted by the parking lock actuator and the clutch actuator can be adjusted by regulating the speed of the electric motor.

2. Actuator arrangement according to claim 1, wherein the parking lock actuator has a parking lock piston, which is mechanically connected to the parking lock arrangement.

3. Actuator arrangement according to claim 2, wherein the parking lock piston is preloaded in the direction of the closed position.

4. Actuator arrangement according to claim 2, wherein the parking lock piston is part of a parking lock piston/cylinder arrangement, wherein, for the purpose of preloading the parking lock piston into the closed position, a preloading device engages on a section of the parking lock piston which is arranged outside a parking lock cylinder of the parking lock piston/cylinder arrangement.

5. Actuator arrangement according to claim 1, wherein the retaining device engages on a retaining projection connected to a parking lock piston or to a parking lock member of the parking lock arrangement.

6. Actuator arrangement according to claim 1, wherein the retaining device has a retaining position and a release position, wherein the retaining device is preloaded into the retaining position.

7. Actuator arrangement according to claim 1, wherein the retaining device can be actuated by means of a solenoid actuator.

* * * * *